Aug. 31, 1926.
1,598,035
A. BARABINO ET AL
MACHINE FOR THE MANUFACTURE OF SMALL PACKINGS
Filed May 21, 1924
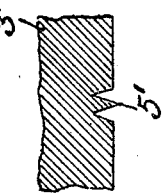
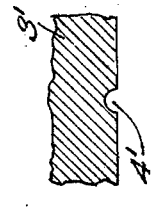
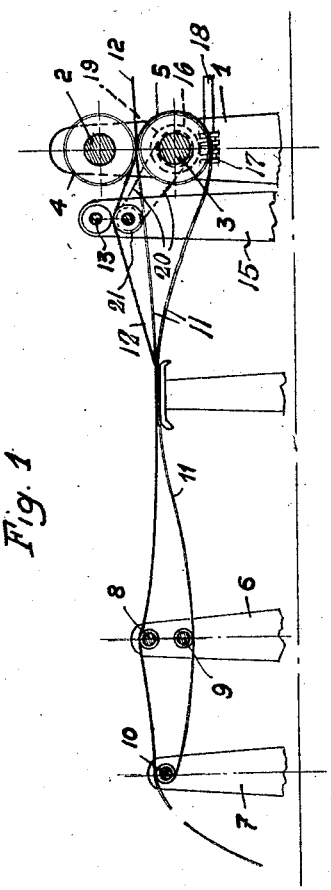
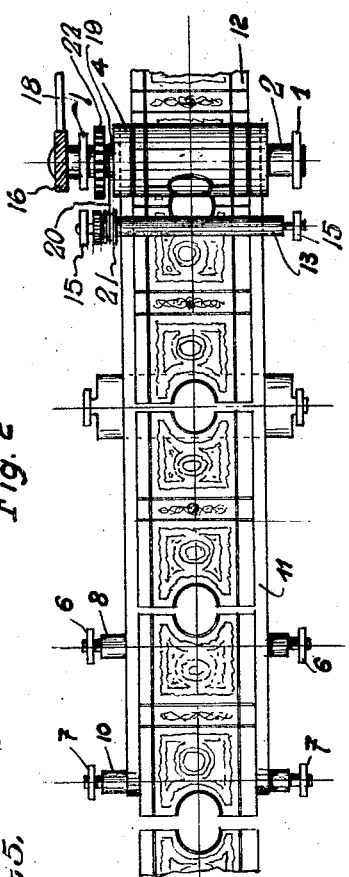
Inventors
A. Barabino
F. Graeve
By Marks & Clerk
Attys.

Patented Aug. 31, 1926.

1,598,035

UNITED STATES PATENT OFFICE.

ADOLFO BARABINO AND FRANCESCO GRAEVE, OF GENOA, ITALY.

MACHINE FOR THE MANUFACTURE OF SMALL PACKINGS.

Application filed May 21, 1924, Serial No. 714,946, and in Italy May 23, 1923.

The invention relates to improvements in machines for the manufacture of boxes, casings, envelopes, packages and small packings in general from a continuous web of paper or card-board strip which is unwound from a reel while the paper may be previously supplied with printed data if desired. The improvement consists in the arranging of the tools for cutting, punching, perforating and grooving the paper on one of a pair of rotatable cylinders while an endless conveyor belt is arranged to pass between these cylinders for conducting the paper strip.

The object of the invention is to provide an improved machine of the above type which in comparison with those already known has the advantages of producing a larger output and a more efficient product.

The invention is illustrated in the drawing, in which:—

Fig. 1 is a longitudinal partial sectional view of the improved device.

Fig. 2 is a top plan view thereof.

Figures 3 and 4 are details of two tools.

Fig. 5 is an enlarged fragmentary sectional view of the endless belt.

Referring more particularly to these figures, upon the uprights 1 are arranged the two horizontal parallel shafts 2 and 3 in engagement with each other by two gear wheels. Upon the shafts 2 and 3 are arranged two hollow cylinders 4 and 5 of which the upper cylinder 4 has applied thereto working tools 3' and 3''. These tools consist of bodies 3' having grooves 4' as in Fig. 4 with more or less well rounded edges for grooving the paper strip, in order to provide creases to facilitate bending of the paper, and also of bodies 3'' having cutting edges for punching as shown at 5' in Fig. 3. These tools 3' are arranged according to the design and the kind of package which is to be made. On other uprights 6 and 7 are arranged rolls 8, 9 and 10 with their axes parallel to those of the shafts 2 and 3. The cylinder 5 and the rolls 8, 9 and 10 have operating thereabout an endless conveyor belt 11 preferably in the form of a solid textile fabric belt provided with a superposed layer 11' of rubber or other resilient material. This conveyor belt operates loosely about the rolls 8, 9 and 10 and is operated by the cylinders 4 and 5. The paper strip 12 which is to be grooved and cut is introduced between the cylinders 4 and 5 so as to be positioned between the cylinder 4 and the rubber surface of the endless belt 11. The conveyor belt under pressure between the two cylinders pushes the paper strip against the working tools after which operation the paper strip continues its movement and is supported on the belt 11. A pair of rolls 13 are provided for separating the cut and grooved sections of the paper strip. These rolls are arranged in proximity to the cylinders 4 and 5 and are operated in any convenient manner so as to assume a higher linear speed than that of the cylinders 4 and 5. The object of the rolls 13 is to exert a traction effort upon the portion of the paper strip which has been previously subjected to the action of the cylinders 4 and 5 and to effect the separation of the single pieces in which the continuous strip has to be divided.

In order to operatively support the rolls 13 and to drive the cylinders 4 and 5 there is provided a shaft 18, which carries a worm for meshing with the worm wheel 16 carried in turn with the roller cylinder 5. The spur wheel not shown integral with the cylinder 8 meshes with a small spur wheel on the cylinder 4 so as to effect the positive drive of a spur cylinder. A rope pulley 19 is engaged by a rope 20, the rope also engaging the pulley 21 on the roll 14 and supported with the roll 13 on the uprights 15 while the roll 14 in addition carries a spur wheel not shown meshing with a small spur wheel 23 on the upper roll 13 so as to effect positive drive to the roll 13.

In the cutting tool 3'' shown in Fig. 3, the belt pushes the paper against the cutting edge which produces a clean cut in the paper. As soon as the single paper or card board sheets which are separated from each other by the rolls 13 overrun the roll 10 they drop on account of their weight into a suitable receiving receptacle, (not shown) adapted to be arranged beneath the delivery end of the belt.

In the cutting tool 3' shown in Fig. 4 of the cylinder 4 coacts with the cylinder 15 to groove the paper or cardboard so as to facilitate the bending of the same. The elasticity of the conveyor belt which pushes the paper in the groove of the tool slightly presses along the two edges of the groove whilst between these edges the paper is slightly curved or creased so as to facilitate the bending.

Having thus fully described the invention what is claimed as new and desired to be secured by Letters Patent is:—

In a machine for the manufacture of paper-like packages comprising in combination, a support, a pair of closely arranged cylinders rotatably mounted on the support and operatively connected to each other, cutting and impression tools mounted on one of the cylinders, rolls mounted in the support opposite the cylinders, an endless paper-like strip feeding and supporting belt trained over the other of the cylinders and the rolls, and a layer of resilient material on the outer surface of the belt for pressing the paper-like strip against the tool carrying cylinder and facilitating the feeding of the strip substantially as and for the purposes set forth.

In testimony whereof we have signed our names to this specification.

ADOLFO BARABINO.
FRANCESCO GRAEVE.